LE VERN FOX.
GASOLENE MOTOR CAR.
APPLICATION FILED MAR. 24, 1916.
1,255,731.
Patented Feb. 5, 1918.
3 SHEETS—SHEET 1.
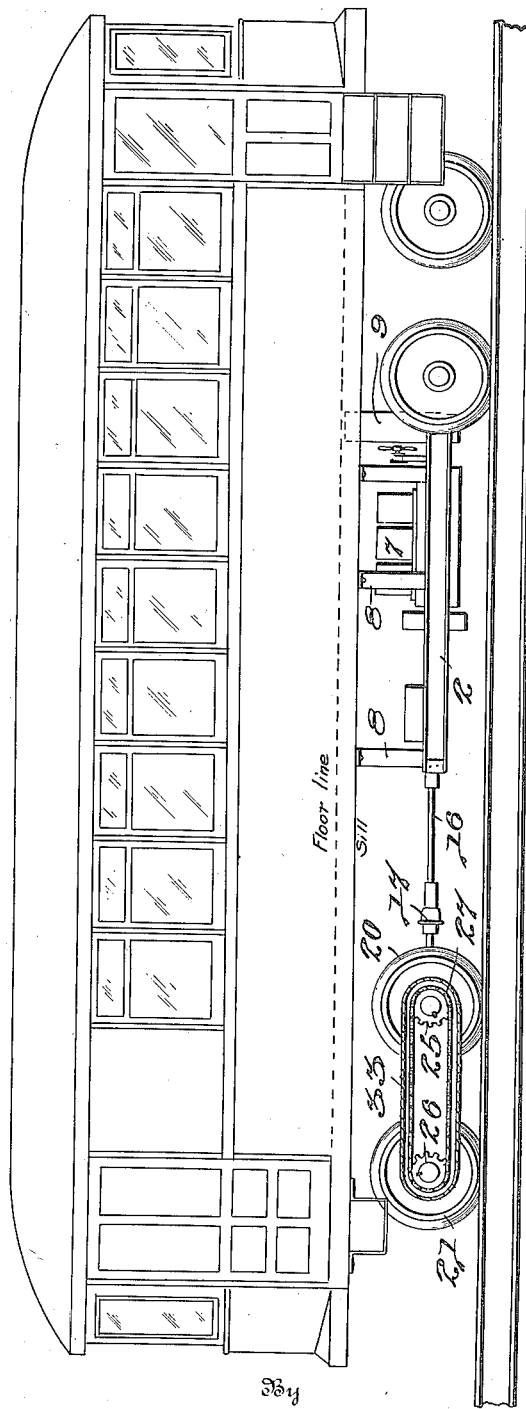

LE VERN FOX.
GASOLENE MOTOR CAR.
APPLICATION FILED MAR. 24, 1916.
1,255,731.
Patented Feb. 5, 1918.
3 SHEETS—SHEET 2.
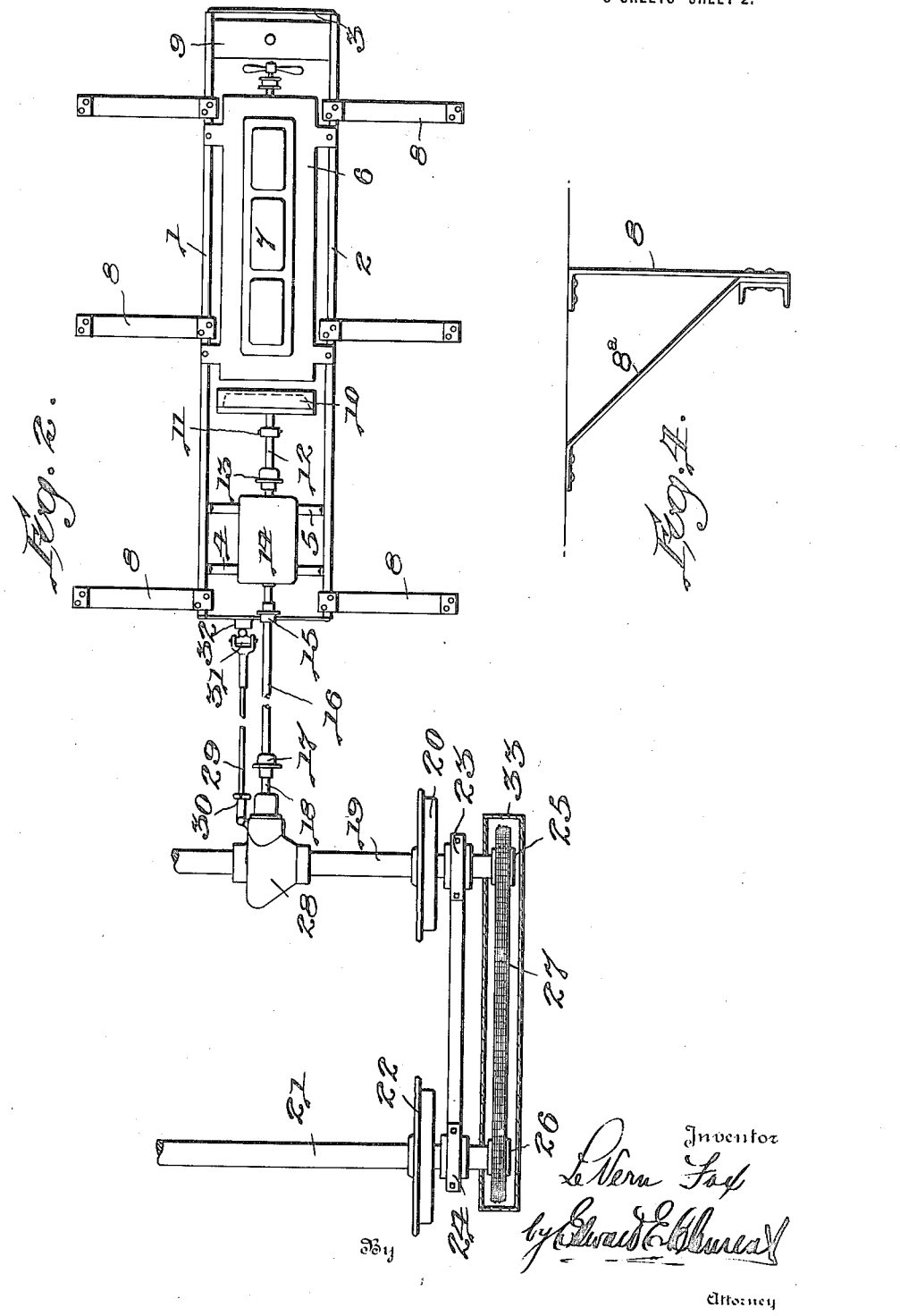

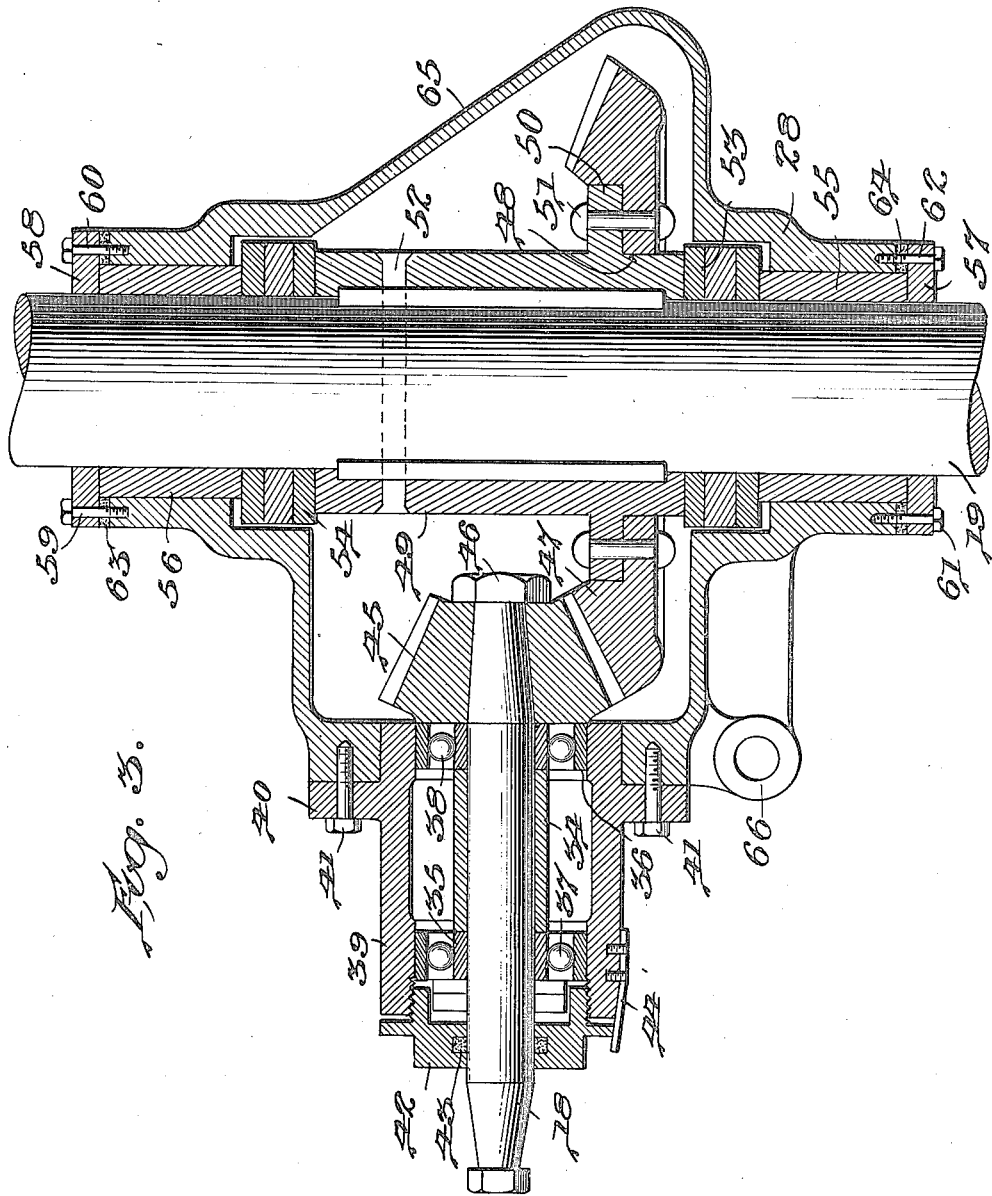

UNITED STATES PATENT OFFICE.

LE VERN FOX, OF HUTCHINSON, KANSAS.

GASOLENE MOTOR-CAR.

1,255,731.     Specification of Letters Patent.     Patented Feb. 5, 1918.

Application filed March 24, 1916. Serial No. 86,403.

*To all whom it may concern:*

Be it known that I, LE VERN Fox, a citizen of the United States of America, residing at Hutchinson, in the county of Reno and State of Kansas, have invented certain new and useful Improvements in Gasolene Motor-Cars, of which the following is a specification, reference being had therein to the accompanying drawing.

My invention relates to railway cars, and has for its object the improvement of motor cars, with particular reference to so-called "gasolene motors" by which are meant those motors which employ internal combustion engines of all types. The term is sometimes used to include compressed air or steam cars using gasolene for fuel, although such motors are not subject to the limitations, and do not require the same refinements of mounting and connection as the internal combustion motors. For example, a steam engine may be and has been mounted upon the axle of a car, with auxiliary suspension and intermediate gears, connecting the piston with the axle; and compressed air motors in so far as they are employed, can be mounted in a similar way. An example of such mounting is found in U. S. Letters Patent 801,448, granted October 10, 1905, to C. Fellner. It would obviously be impracticable for an internal combustion engine which requires a fly wheel, change gears or the equivalent, and other auxiliary parts not required by a vapor engine.

In standard railway practice, it is well understood that careful provision must be made for relative motion between a car body and the wheels or trucks, between different parts of the car body, and between any auxiliary parts mounted upon and requiring connection between the movable parts. Thus for example it is necessary to provide both for and against lateral motion of the body and also swinging motion of the body upon and around the truck bolsters as well as a rotary motion on the king bolts or equivalent parts. Transmission of power from an element mounted on a car body to another element mounted on a truck axle or vice versa, has always been attained with more or less difficulty on account of the complex motions met in operation which include relative longitudinal motion as well as the others mentioned. Attempts have been made to compensate for this by using oblique transmission shafts with or without compensating joints, the idea being that either longitudinal or vertical motion of the body would be taken up by angular displacement around the axle of the connecting gears. This has not proved successful in practice, however, and one object of my invention is to meet this condition by effecting a rigid distance connection between the power plant and the axle, while at the same time permitting a universal motion in every other respect. In order to render the transmission efficient, which is impossible with a normally oblique shaft, and at the same time to preserve the advantages of mounting the power plant on the car body, I assemble and mount the complete power plant as a unit upon a rigid auxiliary frame and suspend or hang the same beneath the car body, approximately at the level of the truck axles or truck frames, so that the power transmission elements are normally horizontal and longitudinally in alinement between the centers of the trucks.

In order to accomplish fixed longitudinal relation between the power plant and the driven axle, I employ a connecting or torsion rod containing universal motion, and extending from the gear case or gear mounting on the axle to the frame of the power plant itself. In systems previously proposed so far as I am aware, torsion rods or elements of this character have always been secured to the fixed parts such as the truck frames, or to the body. Obviously such arrangements are open to the fatal objection that they bear no relation to the power plant and serve only to keep the gear supports or bearings from turning around the axle.

By providing universal joints in my propeller shaft by which it becomes a universally flexible shaft, I find that practically all the motions which take place in operation are compensated for by slight variations from normal direction of the transmission line, while the engagement and position of gears, and the distance relation between the parts is never affected. This applies to the rounding of curves, sudden acceleration and deceleration, road shocks, and the like.

An ancillary but very important advantage flowing from the low suspension of the power plant, is that its weight tends to steady the car body, and by throwing the center of gravity downward, to stabilize its motion. In order to render this result certain as well as protect the power plant itself from certain lateral shocks, I provide a mode of suspension with lateral braces which will be specifically described and claimed hereinafter. It will be noted, however, that fore and aft the longitudinal bracing is not so important, so long as there is a sufficient factor of safety allowed in figuring the strength of the suspension devices.

In connection with the suspension of the power plant, and its horizontal connection to the axle, it should be noted that in order to produce symmetrical compensation, the power plant and connections must be substantially central, and the shaft and gear connections must be between and not outside of the wheels of the truck or trucks. A system in which it was attempted to drive from the body to the end of the axle would be obviously impracticable if not entirely inoperative, because of the greatly multiplied motion of the ends of the axles as the trucks turn in rounding curves and the like.

My invention is illustrated in the accompanying drawings, in which—

Figure 1 is a side elevation of my power plant and connections, attached beneath a car.

Fig. 2 is a plan view of the same looking from above.

Fig. 3 is a sectional view on an enlarged scale of the gear box on the driving axle and connecting parts.

Fig. 4 is a detail view of one of the hangers shown in Fig. 2.

In the drawings, 1—2—3—4 represents the chassis, formed of structural metal shapes of the type usually employed in automobile construction, which I provide as the supporting framework for my power plant. At the front end of the chassis is mounted a radiator 9, which, however, is not in itself a part of the invention. Bridged across the side bars to the rear of the radiator is the bed plate 6, carrying the engine 7, there being indicated three pairs of cylinders, without any valve or other attachments. It is to be understood that the drawing of these parts is diagrammatic, as the details vary with the type of engine employed, and can be supplied by a skilled engineer, without invention.

10 designates the fly wheel and cone-clutch, 11 a coupling for the stub shaft on the propeller side of the clutch. 12 is the transmission shaft extending from the coupling to the transmission gear case 14, and having inserted in it a universal joint 13. The transmission gears 14 in their case, are supported on parallel bridges 4 and 5. From the rear end of this case the propeller shaft 16 extends to the gear case 28 on the axle 19 of the car truck. The shaft 16 is provided with two universal joints 15 and 17, and the gear case is provided with a torsion rod 29, having a turn-buckle 30 and a universal motion 31, through which it is connected at 32 to the end member of the chassis.

The operation of this system, as thus far briefly described, is readily understood. Power is transmitted from the engine in such ratio as may be determined by manipulation of the transmission gears, through the propeller shaft and the intermeshing gears in the box 28, to the axle 19, and this may be direct or reversed, according to the position of the transmission gears. I have found that to exert power upon one pair of wheels alone is not efficient, however, because a slight film of water or ice on the track will cause spinning and immediate loss of tractile effect. To avoid this, and prevent the first pull of the engine from overcoming the spot adhesion of the wheel rims to the rails, I couple the two axles of the truck together, in the manner shown. The axle 19 carries the sprocket 25, and the axle 21 carries a sprocket 26. These two sprockets are reciprocally driven by means of a chain 27. Sprockets and chain, as well as the ends of the axles, are housed in a casing 33, provided with openings fitting upon the axles, and which may be filled with oil if desired, but is primarily intended to keep dust and grit out of the chain.

Referring to Fig. 3, the gear box 28 is preferably a casting made in parts bolted together, but may be integral and cored out, with a hand-hold provided with a suitable cover bolted in place, and large enough to give access to the working parts and permit their removal if necessary. The universal joint 17 of the propeller shaft 16 is connected with the gears in this box through a short shaft 18 fitted with a sleeve 34 and race rings 35 and 36 for ball bearings 37 and 38. The outer race rings for these ball bearings are made a driving fit in a cylindrical casting 39, flanged at 40 to receive bolts 41 which secure it to the casing. The end of this casting is closed by a cap ring 42, carrying a gland 43 of any usual or preferred type to retain oil. This cap ring is locked against turning by means of a spring latch 44 taking into a slot in the edge of the cap, which therefore cannot back off. On its inner end the shaft 18 carries a bevel pinion 45, which may be keyed on, but is shown as having a coned opening to fit the coned end of the shaft, upon which it is forced and held by the nut 46. This pinion intermeshes with the teeth of a bevel gear 47, cast with a large central opening 48 which takes around one end of the sleeve 49, the inner flange of the gear resting against an exterior flange 50 of the sleeve, to which it is secured by rivets or bolts 51.

The sleeve 49 is keyed to the axle 19, and may be cast in two parts for ready application. It is shown with a through bolt 52 securing it on the shaft, but this is a detail forming no special part of my invention by itself. At each end of the sleeve are end thrust bearings 53 and 54 and outside of these are the brasses or Babbitt metal liners 55 and 56. The shaft openings in the casing are closed by cap rings 57 and 58, held to the fairly ground faces by bolts 59, 60, 61, 62 and with interposed packing rings 63 and 64 to retain the oil.

It will be observed that the casing has an enlargement 65 giving it a conical shape with the extension around the shaft 18 forming an intersecting cylinder. Not only has it been found easy to cast this shape, but it possesses certain elements of strength which particularly adapt it to resist the strains to which it is subjected in practice, without fracture, though not containing a large mass of metal. It runs filled with oil, and requires practically no attention so long as the oil lasts. In this Fig. 3 the attachment 66 for the torsion rod is shown formed upon the body of the casing, but if desired it may be cast upon the cylinder 39, or may be formed separately and attached by means of the bolt 41.

I am aware that it has heretofore been proposed to drive railway coaches of the common type by means of gasolene engines, and I am also aware that auxiliary plants for lighting, refrigeration, and other purposes, have been secured beneath car bodies. But I believe it to be novel and original with me to form the power plant as a self-contained unit and hang it beneath the car, practically lining it up with the driven axle, so as to relieve all parts of strain, and especially to prevent undue normal angularity of the propeller shaft. To secure my purpose, I first mount the entire power plant on the chassis 1—2—3—4—5—6, and then suspend the said plant as a unit by means of the brackets 8, or equivalent hangers. It will be observed that these are provided with vertical and diagonal members. The vertical members carry the weight, and the diagonal members take the torsional strain transmitted from the crank shaft, and also take up all side strains due to lateral motion of the car body.

The gasolene motor car equipped with the power unit thus described has been completely reduced to practice and in operation on the Anthony and Northern Railway of Kansas, for a considerable period. Its performance, operating expense, and cost of maintenance are better than those of any other of which I have knowledge by a considerable percentage in every case.

It should be understood that the parts shown in Fig. 3 are constructed in accordance with the proper and usual practice in construction shops. For example the sleeve 48 may be formed in two parts, held together at one end by one or more bolts 52, and at the other end by the encircling ring body of the gear wheel 47, whose inner circular edge 48, when the parts are riveted together, will bind the two halves of the sleeve effectively as one. In any case the keys shown on opposite sides of the shaft must be provided with suitable slots or key-ways in both axle and sleeve although when the sleeve is formed in two halves as described, the slots need not be as long as the keys themselves.

It should be further understood that some changes may be made in the specific construction and arrangement of parts heretofore described without departing from my invention, and that in the use of terms such as "gasolene motor" in the appended claims, I intend to include all other forms and equivalents which present the same characteristics and require the same treatment.

Having thus described my invention what I claim and desire to secure by Letters Patent of the United States is:

1. A gasolene motor car comprising the following instrumentalities: a truck, a body carried upon the truck frame so as to have motion with respect thereto, and a separate and independent rigid frame suspended beneath and from the body of the car in approximately the plane of the truck axles, a self-contained and complete internal combustion engine power plant assembled, adjusted, and rigidly secured as a unit upon said suspended frame, a propeller shaft extending from said unit to an axle on the truck between the wheels thereof, intermeshing gears transmitting power from said shaft to said axle, and means forming part of the power transmitting system extending directly between the power unit and the axle, to permit relative motion thereof without derangement of the gears or loss of power.

2. A gasolene motor car comprising the following instrumentalities: a truck, a body carried upon the truck frame so as to have motion with respect thereto, and a separate and independent rigid frame suspended beneath and from the body of the car in approximately the plane of the truck axles, a self-contained and complete internal combustion engine power plant assembled, adjusted, and rigidly secured as a unit upon said suspended frame, a propeller shaft extending from said unit to an axle on the truck between the wheels thereof, intermeshing gears transmitting power from said shaft to the axle, means forming part of the power transmission members to permit relative movement of the power plant and the truck axle, and means independent of the propeller shaft directly connecting said gears and the power unit for maintaining invariable the driving relation between the gears on the truck axle and the power plant regardless of the motion of the latter or of the car body.

3. A gasolene motor car comprising the following instrumentalities: a truck, a body carried upon the truck frame so as to have motion with respect thereto, and a separate and independent rigid frame suspended beneath and from the body of the car in approximately the plane of the truck axles, a self-contained and complete internal combustion engine power plant assembled, adjusted, and rigidly secured as a unit upon said suspended frame, a propeller shaft extending from said unit to an axle on the truck between the wheels thereof, intermeshing gears transmitting power from said shaft to said axle, means in the propeller shaft for permitting universal motion between the power unit and said gears, and a tie rod containing means for adjustment and universal motion, extending independently of the propeller shaft from the gear support to the power unit, whereby power transmission without loss or interruption is secured while permitting free relative motion of the power plant with the car body and relative to the truck and its axle.

4. A gasolene motor car comprising the following instrumentalities: a car body, a wheeled truck for the same, a rigid unitary independent frame, a complete self-contained internal combustion power plant including transmission gears and controls assembled, lined up, and rigidly secured as a unit on said frame, means for suspending said frame centrally beneath the body of the car, said means adapted to resist both vertical and lateral strains, a power transmitting terminal on said frame, a propeller shaft flexibly connected to said terminal, a gear box mounted by means of alined bearings upon an axle of the truck between the wheels thereof, a toothed gear secured upon the axle within said box, an extension on the box carrying a bearing angularly displaced from the axle bearings, an extension of the propeller shaft journaled in said bearing and extending into the box, a pinion thereon intermeshing with the axle gear, and a connecting rod connecting said box directly with the power plant.

5. A gasolene motor car comprising the following instrumentalities: a car body, a wheeled truck for the same, a self-contained internal combustion power plant rigidly supported and suspended as a unit beneath and centrally of the body and approximately at the level of the truck frame and axles of the car, a propeller shaft and intermeshing gears connecting said unit to an intermediate point on one axle of the truck, a chain and sprocket connection between said axle and a companion axle, a box for said gears carried by said axle, and a connecting rod connecting said box directly with the power plant.

6. A gasolene motor car comprising the following instrumentalities: a car body, a wheeled truck for the same, a complete self-contained internal combustion power plant with a rigid frame carrying the same as a unit, means for suspending the said frame centrally from the body of the car, a propeller shaft from said power unit to an intermediate point on an axle of the truck, intermeshing gears connecting said shaft and axle, a support alined upon the axle and carrying a bearing for one of said gears, and a torsion rod connecting said support to said frame.

7. A gasolene motor car comprising the following instrumentalities: a car body, a wheeled truck for the same, a complete self-contained internal combustion engine power plant with a rigid frame carrying the same as a unit, means for suspending said frame from the body of the car at approximately the level of the truck axles, a flexible propeller shaft extending from said power unit to an axle of the truck, intermeshing gears connecting said shaft and axle, a support alined upon said axle and carrying a bearing for said shaft gear, and a flexible torsion rod directly connecting said support to the power plant, whereby efficient and uniform transmission of power is accomplished and the proper engagement of said gears and their relation to the power plant are maintained for all relative positions of said power plant, the body of the car, and the axles.

8. A gasolene motor car comprising the following instrumentalities: a car body, two four-wheeled trucks spaced apart and flexibly connected to said body, frames, axles and wheels for said trucks, a complete self-contained internal combustion power plant assembled, alined and secured as a unit upon a rigid frame with means suspending the same from and beneath the body of the car between and approximately at the level of the truck frames and axles, a power transmitting terminal on said frame, a gear support and bearing and intermeshing gears on one truck axle, between the wheels thereof, a flexible power transmitting shaft connected at one end to said power terminal and at the other end through said intermeshing gears to said axle, and a flexible torsion rod directly connecting the said gear support and the power plant, so as to maintain the same at a proper distance relation, and the gears against displacement for all relative movements of the power plant and the axle.

9. A gasolene motor car comprising the following instrumentalities: a car body, four-wheeled trucks supporting the same, a complete self-contained internal combustion engine power plant assembled, lined up, and rigidly secured as a unit upon a separate frame, means for suspending said frame centrally from and beneath the car body between the trucks, with means to prevent lateral displacement of said frame, a power terminal on said power unit, a gear support and intermeshing gears carried on one axle of a truck, between the wheels thereof, a flexible propeller shaft extending from said power terminal to said gears, flexible means separate from the shaft for maintaining invariable distance relation between the power unit and the gears, said means also maintaining the propeller gear and mounting in proper angular position with respect to the axle gear, and means attached to the ends of both axles of the driven truck outside of the wheels for transmitting power from one to the other.

10. A gasolene motor car comprising the following instrumentalities: a car body, four-wheeled trucks supporting the same, a complete self-contained internal combustion engine power plant assembled, lined up, and rigidly secured as a unit upon a separate frame, means for suspending said frame centrally from and beneath the car body between the trucks, with means to prevent lateral displacement of said frame, a power terminal on said power unit, a gear support and intermeshing gears carried on one axle of a truck, between the wheels thereof, a flexible propeller shaft extending from said power terminal to said gears, flexible means for maintaining invariable distance relation between the power unit and the gears, said means also maintaining the propeller gear and mounting in proper angular position with respect to the axle gear, and sprocket wheels rigidly secured to the outside ends of both axles of the driven truck, with a driving chain connecting them, and a weather and dust proof casing inclosing the same.

In testimony whereof I affix my signature.

LE VERN FOX.